May 12, 1931.　　　N. M. GAGE　　　1,804,868
LUGGAGE CARRIER
Filed Sept. 20, 1928　　2 Sheets-Sheet 1

Inventor
Nellie M. Gage

By Lacey & Lacey, Attorneys

May 12, 1931.  N. M. GAGE  1,804,868
LUGGAGE CARRIER
Filed Sept. 20, 1928    2 Sheets-Sheet 2

Inventor
Nellie M Gage
By Lacey & Lacey, Attorneys

Patented May 12, 1931

1,804,868

UNITED STATES PATENT OFFICE

NELLIE M. GAGE, OF DAYTON, OHIO

LUGGAGE CARRIER

Application filed September 20, 1928. Serial No. 307,293.

The invention provides a carrier for luggage which may be conveniently positioned above the top of a vehicle so as to be out of the way and admit of an equal distribution of the weight.

The invention furthermore aims to devise an article of the nature aforesaid which will not detract from the appearance of the vehicle to which it may be applied, and which is susceptible of general application to motor driven or horse drawn vehicles of various types and makes.

A further purpose of the invention is to provide an article of the nature stated which is light, capable of being readily and conveniently handled, and including a supporting frame and a receiver for the articles to be carried, said parts being readily separable and adapted to be made secure when assembled.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which:—

Figure 5 is a detail sectional view of a part of the supporting frame and receiver showing more clearly the fastening means therefor.

Corresponding and like parts are referred to in the following description and designated in the several views of the drawings by like reference characters.

Figure 1:
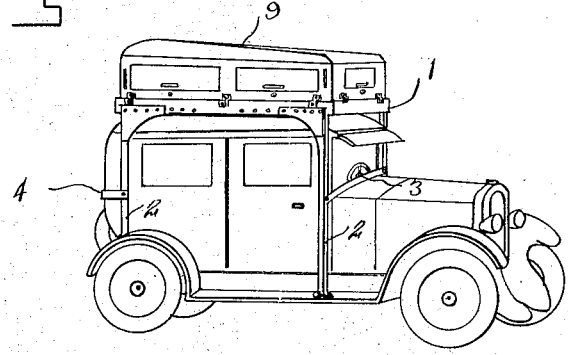
Figure 1 is a perspective view of an automobile provided with a luggage carrier embodying the invention.

While the invention is designed for general application it is adapted more particularly for automobiles and is illustrated in this application in Figure 1 of the drawings.

As hereinbefore stated the device comprises a lower supporting frame and an upper receiver for baggage and other articles to be carried. These parts are readily separable for convenience of manufacture and handling. The supporting structure includes a frame 1 and uprights 2. Cross bars 3 and 4 connect the respective front and rear uprights. The frame 1 is of L-shape, with respect to the formation of the enclosing members, and in consequence the receiver is supported upon an inwardly disposed flange and is held against lateral and longitudinal displacement by an upstanding flange. The frame 1 is strengthened by cross bars 5. A plurality of openings are formed in the side bars of the frame 1 and admit of adjustable connection of the upright 2 to the frame. A plate 7 is attached to the upper end of each of the uprights 2 and is adapted to be adjustably connected to the frame 1 in any determinate way.

As indicated most clearly in Figure 1 of the drawings the supporting frame is attached to the vehicle by means of the uprights 2 which are fast at their lower ends to the rear fenders and the running board in any substantial way.

Figure 2:
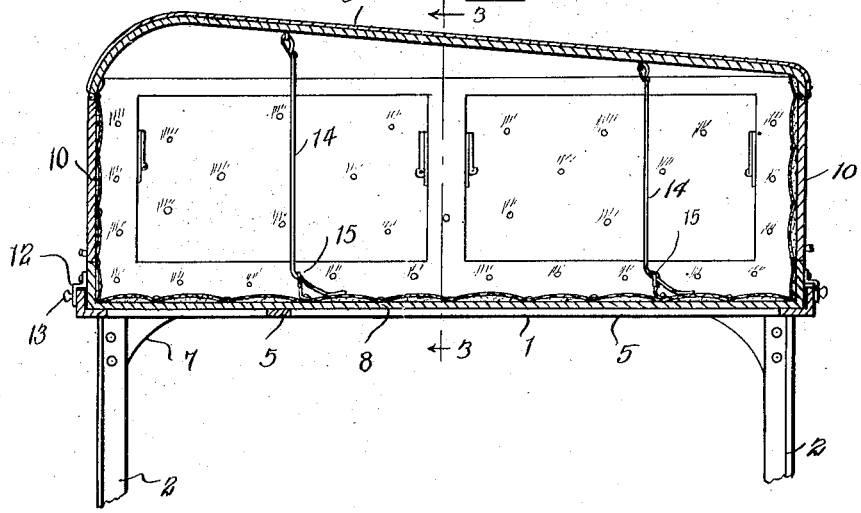
Figure 2 is a vertical, central, longitudinal sectional view of the upper portion of the luggage carrier showing the parts on a larger scale.
Figure 3:
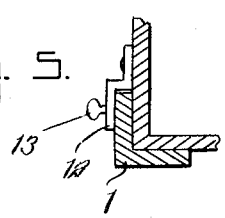
Figure 3 is a transverse sectional view on the line 3—3 of Figure 2 looking in the direction of the arrows.
Figure 3:
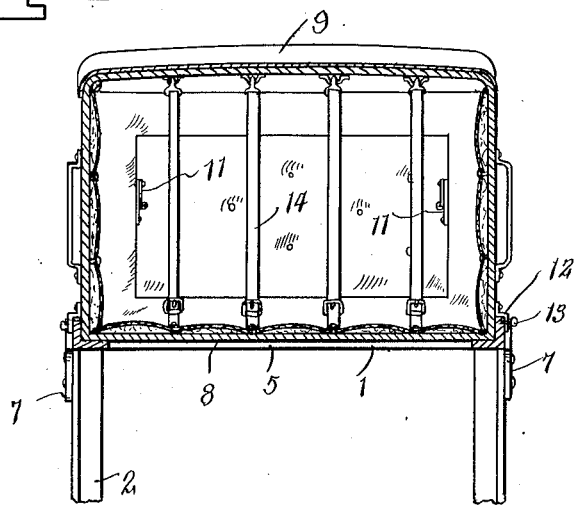
Figure 4:
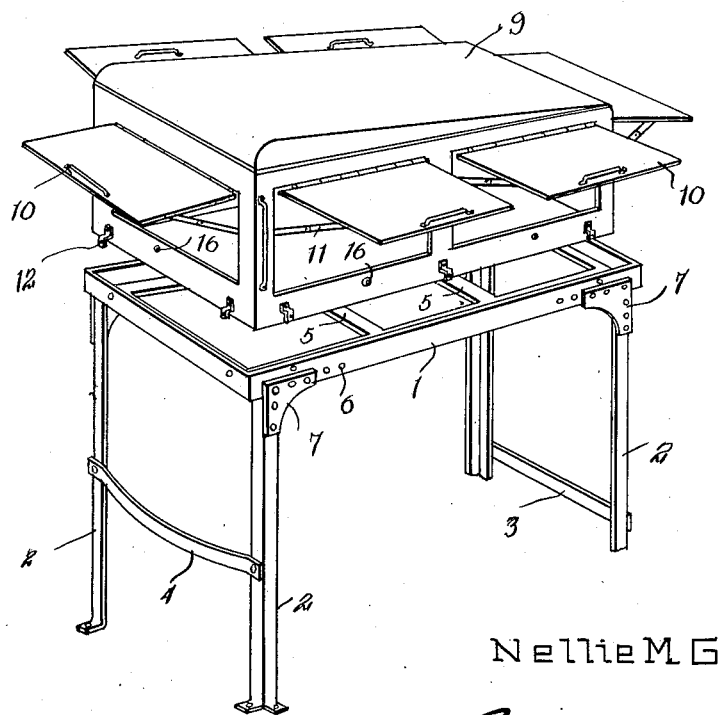
Figure 4 is a detail perspective view of the device, the receiver being slightly elevated from the supporting frame and the doors at the sides being in open position.

The receiver or holder for the baggage or articles to be carried comprises a hollow body including a bottom or floor 8, a top 9 and enclosing sides in which are formed openings to which are fitted doors 10. The doors are hinged to swing outwardly and upwardly, as indicated most clearly in Figure 4 of the drawings, and may be supported in open position by means of braces 11. The front and rear openings of the receiver admit of articles, such as a canoe and tent poles projecting beyond the ends of the receiver, as will be readily appreciated. The device may be formed of any substantial and light material and is padded upon the inner side to obviate noise and to prevent injury to the articles placed within the receiver for transportation. The receiver may be of any finish and, as shown, it conforms to the outline of the top of an automobile or analogous vehicle. The relative dimensions of the receiver and frame 1 are such as to admit of the receiver resting upon the inner flange of the frame and the upstanding flange of the frame snugly embracing the lower portion of the receiver, as indicated most clearly in Figures 2 and 3 of the drawings.

Suitable fastening means are employed for securing the receiver when properly positioned upon the supporting frame. As shown metal straps 12 are secured to the lower portion of the sides of the receiver and are offset to extend along the outer side of the frame 1 to which the receiver is secured by thumb screws 13 engaging the elements 12 and the upstanding flange of the frame 1. Suitable handles are applied to the body of the receiver and to the doors 10 for convenience of manipulating said parts.

The construction and design of the device may be such as not to detract from the appearance of the vehicle to which the luggage carrier may be attached. The supporting frame may remain in position and the receiver or holder detached when it is not required for immediate service. The arrangement presents a neat appearance and is not liable to attract attention or interfere with the outline of the vehicle body. Provision is had for securing the luggage against movement when placed within the receiver. These means include straps 14 which depend from the top 9 and coact with buckles 15 attached to the bottom 8 by means of short straps. The straps 14 are differently positioned in the length and width of the receiver to insure securement of the luggage against movement when it is required to fasten the same. The doors 10 may be secured when closed by suitably disposed fastening means, such as locks 16.

Having thus described the invention, I claim:—

1. The combination with a vehicle having a top and a supporting structure applied thereto and including uprights and a horizontal frame, said frame comprising L-shaped bars to provide a recess, of a receiver for the articles to be transported removably engaged in the recess and disposed above the top of the vehicle.

2. An automobile luggage carrier comprising front and rear uprights adapted to be secured to the lower body structure of an automobile and extend upwardly along the front and rear corners of the body so as not to obstruct vision, a frame carried by said uprights adapted to extend substantially parallel with and above the top of the automobile and terminate at the sides and ends adjacent to the sides and ends of the automobile top, side plates carried by the upper ends of said uprights and extending along said frame at the corners thereof, adjustable connections between the plates and frame permitting of the frame being mounted on automobile bodies of various heights and lengths, and a container for luggage carried by said frame.

3. An automobile luggage carrier comprising front and rear uprights adapted to be secured to the automobile body structure and extend along the corner posts thereof, a frame carried by the upper ends of said uprights adapted to be spaced above the automobile top and having sides and ends substantially L-shaped in cross-section and disposed substantially flush with the sides and ends of the automobile top, and a container fitting within said frame and confined against dislodgment by the angular contour of the sides and ends of the frame.

In testimony whereof I affix my signature.

NELLIE M. GAGE. [L. S.]